United States Patent [19]

Wristers

[11] 3,905,915

[45] Sept. 16, 1975

[54] MULTIPLE-STEP PROCEDURE FOR PRODUCING A POLYMERIZATION CATALYST

[75] Inventor: Harry J. Wristers, Baytown, Tex.

[73] Assignee: Exxon Research and Engineering Company, Linden, N.J.

[22] Filed: June 21, 1973

[21] Appl. No.: 372,110

Related U.S. Application Data

[63] Continuation-in-part of Ser. No. 162,701, July 14, 1971, abandoned.

[52] U.S. Cl. .................. 252/429 A; 252/429 C
[51] Int. Cl. ............................................ B01j 31/02
[58] Field of Search ............... 252/429 A, 429 C

[56] References Cited
UNITED STATES PATENTS

| | | | |
|---|---|---|---|
| 3,238,145 | 3/1966 | Loeb | 252/429 A |
| 3,267,086 | 8/1966 | Tornquist | 252/429 A |
| 3,357,967 | 12/1967 | Wesslau | 252/429 C |
| 3,424,774 | 1/1969 | Tornquist | 252/429 A |
| 3,769,233 | 10/1973 | Hermans et al. | 252/429 A |

*Primary Examiner*—Helen M. S. Sneed
*Attorney, Agent, or Firm*—David A. Roth

[57] ABSTRACT

The particle size is increased and particle size range is decreased without loss of compactness in a Ziegler-type catalyst, by carrying out the reduction reaction in the presence of a preformed catalyst at a reduction rate which minimizes formation of new nuclei. The reduction of $TiCl_4$ with diethylaluminum, ethyl aluminum dichloride, triethyl aluminum, and mixtures thereof, is exemplary. The preformed catalyst is mixed with the reactants at a low temperature at which the rate of reduction is negligible (e.g. $-40°$ to $-5°$ C.), and the reactants are slowly heated ($0.2°$ C/min to $2.0°$ C/min) while in a well-mixed zone until a holding temperature of $+25°$ C. to $+45°$ C. is reached. The reactants are held at the holding temperature for 0 to 120 minutes, after which the catalyst is activated by heating at $160°$ C. for 1 hour. If the reduction step is to be repeated, the catalyst is not activated, but is cooled to $-30°$ C. for repetition of the reduction step. Preferably, the reduction step is repeated three times, the catalyst in the reduction zone during the holding step providing the preformed catalyst for the following reduction procedure.

18 Claims, No Drawings

MULTIPLE-STEP PROCEDURE FOR PRODUCING A POLYMERIZATION CATALYST

CROSS REFERENCE TO RELATED APPLICATIONS

This application is a continuation-in-part of Ser. No. 162,701 filed July 14, 1971, now abandoned.

BACKGROUND OF THE INVENTION

1. Field of the Invention

This invention relates to the preparation of a Ziegler-type catalyst having rounded, compact particles of a relatively narrow size distribution range and having a mean particle diameter greater than about 10, preferably 20 microns. The catalyst of the present invention is particularly useful in the polymerization of α-olefins to produce polyolefin powders.

2. Description of the Prior Art

The sterospecific polymerization of α-olefins such as propylene is well known in the art. Polypropylene resin has become a well-established plastic in the world market. Polypropylene powder sales are also increasing rapidly and, at the present time, are increasing more rapidly than sales of polypropylene pellets. The popularity of the polypropylene powder derives, at least in part, from the rapidly expanding use of filled grades of polypropylene, particularly glass- or talc-filled grades.

Most customers demand that polypropylene powder provide all of the resin quality normally obtainable in pelletized products and, in addition, that the powder possess the qualities of good flowability, low fines content, and no "clods" (large aggregates of particles). A reasonably high bulk density is also desirable.

DESCRIPTION OF THE INVENTION

It has been found that polymer powders which are composed of rounded, compact particles having a relatively narrow range of particle sizes provide these desired physical properties. It has also been found that, since the catalyst particles provide "templates" for the formation of polymer particles, the catalyst particles themselves must be rounded, compact and of a relatively narrow particle size range. Further, in order to obtain larger powder particles, the catalyst particles themselves must possess a mean particle diameter of at least 10, preferably at least 20 (most preferably at least 35) microns. Prior to the present invention, it has not been practicable to meet all of these objectives concurrently. A catalyst having rounded, compact particles of a narrow particle size range can be produced, but the product has a very small average particle diameter. A catalyst having larger particles can be prepared, but only at the expense of losing compactness. The catalyst product can be sieved to increase the mean particle diameter by separating the larger particles from the smaller, but since there is no utility for the discarded fines, this approach has not heretofore been attractive. The present invention allows the discarded fines to be used as a "seed" producing larger particles, if desired.

The production of a catalyst of small particle size but having the other desirable characteristics is disclosed in British Pat. No. 1,139,450. In that patent, a single-step process of low temperature reduction of TiCl$_4$ under well-mixed conditions is employed. TiCl$_4$ and a reducing agent (such as di-ethylaluminum chloride-"DEAC") are mixed at low temperatures (e.g. −40° C. to +15° C.) and slowly heated while under agitation to a holding temperature of 25° to 45° C. Where DEAC is employed, the temperature should be below −5° C. The reagents are maintained at the holding temperature for at least 2 hours.

It has been found that, by using ethyl aluminum dichloride ("EADC") as a reducing agent, larger particles can be obtained. The catalyst so produced contains a higher proportion of AlCl$_3$ and, consequently, suffers a loss in activity relative to catalyst produced with DEAC. The choice of reducing agents will, therefore, depend on the needs of the user. A mixture of DEAC and EADC can also be used, of course, as can triethyl aluminum ("TEA").

The present invention provides a process whereby a Ziegler-type catalyst of larger particle size (e.g. 10 to 200, preferably 20 to 200 microns, most preferably 10 to 50 microns, average mean particle diameter) can be produced, which consists of rounded, compact particles having a relatively narrow particle size range. The present invention utilizes a dispersion of finely divided, already prepared catalyst as a solid phase in the reduction zone during the reaction of TiCl$_4$ (preferably with diethylaluminum chloride) to produce the final product. In this manner, an agglomeration of catalyst fines can occur as well as crystal growth so as to obtain the desired product.

The production of Ziegler-type catalysts from TiCl$_4$ can be acomplished with several reducing agents, each of which produces a reduced TiCl$_3$ .n AlCl$_3$ catalyst. The value of $n$ varies with the reducing agent employed. When diethylaluminum chloride (DEAC) is used as the reducing agent, $n$ will range from about 0.15 to about 0.50, and usually will be from 0.28 to 0.43, although theoretically $n$ could be 0.5. Use of ethyl aluminum dichloride (EADC) results in a value of $n$ from 0.3 to 1.0. The catalyst having a higher AlCl$_3$ content usually will have a lower catalyst activity (expressed as grams of polymer product per gram of catalyst employed). Use of an excess of reducing agent provides a catalyst of lower AlCl$_3$ content, but the particles size is smaller.

THE SOLID CATALYST "SEED"

The solid catalyst is not, strictly speaking a "seed" for crystal formation since data indicate that, even though the α form may be used as a "seed" in the present invention, the resulting product is a mixture of α and β-TiCl$_3$ just as in the case where the β form is employed. If true crystal seeding were involved, the product crystal would be in the same form as the seed; i.e., α seeds would yield αproduct. Further, the amounts employed must be far greater than those which are effective in crystal seeding. However, for sake of simplicity of terminology, the solid catalyst will be referred to herein as "seed" catalyst.

The "seed" catalyst can be a previously prepared catalyst of wide or narrow particle size distribution or catalyst "fines" from a sieving operation. The "seed" catalyst can be suitably formed as the first step in a two-step process, utilizing the same reactor for both steps (but completing the first step by utilizing the "holding period" so as to be sure that substantially all of the TiCl$_4$ has been reduced before the second step is begun). Several repetitive reduction/crystallization steps can be carried out, until the desired average particle size has been attained. Preferably, reduction in the presence of seed catalyst will be carried out from three to nine times.

Generally, the same reaction conditions will be employed for the production of the catalyst seed as are employed in the reduction/crystallization step wherein the seed catalyst is employed. These conditions will be discussed hereinbelow.

The seed catalyst will have essentially the same structural formula as the final product, and may have either a wide or a narrow particle size range. An exemplary seed catalyst is illustrated below in Table I.

TABLE I

| EXEMPLARY SEED CATALYST | |
|---|---|
| Formula: | TiCl$_3$.0.37 AlCl$_3$ |
| Crystal Form: | β |
| Average Diameter: | 18 microns |
| Size Distribution: | 15 to 21 microns. |

The amount of seed catalyst employed is based upon the total amount of catalyst to be obtained from the reduction/crystallization step in which the seed catalyst is employed. (In multiple step operations, the solid catalyst present at the beginning of each reduction step is considered to be seed catalyst, even though it has been increased in amount by a preceding seeded reduction/crystallization step). The seed catalyst is employed in amounts of from 31 to 75 parts by weight (preferably 20 to 40 parts by weight) per hundred parts by weight of total (i.e., seed + newly formed) catalyst obtained from the reduction/crystallization step. That is, from 0.33 to 99 parts by weight of new catalyst are formed for each part by weight of seed catalyst, preferably from 19 to 39 parts by weight of new catalyst being formed per part of seed catalyst.

REACTION CONDITIONS

As hereinabove mentioned, the reaction conditions are generally the same whether the seed catalyst is being produced (i.e., being formed as a first step) or whether it is being agglomerated and additional catalyst produced according to the present invention.

The reaction conditions are chosen to encourage crystal growth but without undue formation of new crystal nuclei. By admixing the reagents at a low temperature, at which only insignificant reduction rates are experienced, the amount and rate of reduction can be controlled by the rate at which the reagents are warmed. Thus, temperature and rate of heating are variables of great importance in the present invention.

TEMPERATURE AND PRESSURE

The admixture is formed at a temperature within the range from −40° C., to +15° C., preferably from −5° C. to −30° C. When employing EADC as reducing agent, mixing temperatures as high as 25° C. can be used. The temperature limits are chosen because above 15° C. (25° C. for EADC) the formation of new nuclei begins to be seen and these small nuclei lead to an undue amount of catalyst fines. Temperatures below −40° C. are not necessary, since the rate of raction is negligible at −40° C. Thereafter, the reaction mixture is warmed at a rate of 0.2° to 2.0° C/min., preferably about 0.5° C/min., until the holding temperature of 15° C. to 40° C. (preferably about 30° C.) is reached. The admixture is held at this temperature for 0 to 2 hours (preferably about ½ hour) to ensure complete reaction.

The activating temperature is used to change the crystal form of TiCl$_3$ from β (or a mixture of α and β) into α-TiCl$_3$. This activation step may be carried out without stirring, as more fully discussed hereinafter.

The pressure employed is not critical. Usually, it will range from 10 to 140 psig, preferably 14 psig. It is only important that sufficient pressure be employed to maintain the solvent in the liquid phase.

REACTANT CONCENTRATION

The reduction/crystallization step is carried out with the seed catalyst suspended in an inert reaction diluent which acts as a solvent for TiCl$_4$ and for the reducing agent but not for the catalyst product. Straight chain or branched paraffinic hydrocarbons having from 5 to 12 carbon atoms, such as heptane and isooctane, substantially free of aromatic hydrocarbon impurities, are exemplary of the diluent to be employed. In Table II, the inspection of an isooctane diluent, suitable for the present process, is set forth.

TABLE II

| ISOOCTANE DILUENT | | |
|---|---|---|
| 2,2,4-trimethyl pentane | 78.8 | vol. % |
| 2,3-dimethyl pentane | 7.9 | |
| 2,4-dimethyl pentane | 6.2 | |
| 2,5-dimethyl hexane | 1.5 | |
| 2-methyl hexane | 1.4 | |
| 3-methyl hexane | 1.1 | |
| 2,4-dimethyl hexane | 1.1 | |
| Other Isoparaffinic compounds | 2.0 | |

The TiCl$_4$ and reducing agent are suitably prepared in solution in the selected diluent. Directionally, it has been found that a decrease in reactant concentration leads to an increase in catalyst particle size, but also decreases the compactness of the catalyst particles. DEAC is hereinafter used as exemplary of the reducing agents, although EADC can be used along or in admixture with DEAC. Preferably, if EADC is used, it will be an admixture of 1 part EADC with from 3 to 4 parts of DEAC.

The DEAC solution is preferably first prepared and the seed catalyst suspended therein. The concentration of DEAC in the solvent can range from 0.1 to 7 molar, preferably from 0.5 to 1.0 molar.

The TiCl$_4$ solution is from 0.5 to 4 molar, preferably from 1.5 to 2.0 molar, and is added to the suspension of seed catalyst in DEAC solution over a mixing period of 10 seconds to 4 hours, preferably about 30 minutes, while the reaction zone is maintained at low temperatures. It is preferred that the seed catalyst be present when the TiCl$_4$ solution is being added. It is essential that the seed catalyst be present when TiCl$_4$ is being reduced, so that the benefits of the present invention can be obtained.

The quantities of TiCl$_4$ solution and of DEAC solution are chosen to obtain a molar ratio of TiCl$_4$ to DEAC from 2.0 to 0.5, preferably about 1.3.

The process variables are set out below in Table III.

TABLE III

| Reduction Step | VARIABLES OF THE PROCESS | | |
|---|---|---|---|
| | Min. | Max. | Pref. |
| Seed catalyst | | | |
| Avg. particle size, microns | 3 | 40 | 18 |
| wt/100 parts of total catalyst product | 10 | 75 | 20–40 |
| Reactants | | | |
| TiCl₄/diethylaluminum chloride, mol ratio | 0.5 | 2.0 | 1.3 |
| TiCl4 feed conc in diluent, molar | 0.5 | 4 | 1.5–2.0 |
| Reducing agent feed conc in diluent, molar | 0.1 | 7 | 0.5–1.0 |
| Reaction Conditions | | | |
| Mixing temperature, °C. | –40 | +15 | –5 to –30 |
| Mixing time | 10 sec. | 4 hrs. | 30 min. |
| Heating rate, °C/min | 0.2 | 2.0 | 0.5 |
| Holding Temp, °C. | +25 | +45 | +40 |
| Holding time, hours. | 0 | 2 | ½ |
| Pressure Psig | 10 | 140 | 14 |
| Mixing energy, watts/liter | 100 | 300 | 200 |
| Mixing rpm (for reactor in Examples) | 100 | 800 | 250 |
| Activation Step | | | |
| Heating rate, °C/min | not critical | | |
| Temp., °C. | 145 | 185 | 160 |
| Holding time, minutes | 30 | 120 | 60 |
| Mixing | not needed | | |
| Catalyst Product | | | |
| TiCl₃ . nAlCl₃, where n is: | | | |
| a) for diethylaluminum chloride reduction | 0.15 | 0.5 | 0.28–0.4 |
| b) for ethylaluminum dichloride reduction | 0.3 | 1.0 | 0.7 |
| Particle size, microns (avg.) | 20 | 200 | 24–47 |

MIXING

It is essential that the reduction/crystallization reaction be conducted in a well-mixed reactor, both to provide a good dispersion of the seed catalyst and to promote the production of larger, rounded product catalyst particles. British Pat. No. 1,139,450 provides a good guide to the mixing conditions to be employed. The amount of mixing energy must be determined for a given reactor, since the use of too little or too much mixing energy leads to the production of catalyst fines. The amount of energy (expressed as watts/liter) will depend upon reactor geometry, impeller blade configuration, baffle arrangement, and solution viscosity. The optimum may be determined by experimentation, as is known to those skilled in the art. In general, from 100 to 300 watts/liter should prove to be suitable.

In general, a flat-bladed turbine impeller is preferred. In vessels having an L/D ratio greater than 1, the number of impellers required is about equal to the L/D ratio. For example, if a reactor has an L/D ratio of 1.9, two impellers would be mounted on the drive shaft, spaced so as to provide good mixing throughout the reactor. A specific design is given below for guidance.

In a Pfaudler reactor having an internal diameter of about 18 inches and an L/D ratio of about 1.0, a six-bladed turbine impeller was mounted ten inches above the bottom. Each blade was flat and mounted at an angle of about 45°. Overall impeller diameter was about 14 inches. When used with two full baffles mounted 180° apart, and operated at 100 to 150 rpm, good results were obtained. The mixing energy input under these conditions was approximately 100 to 300 watts/liter. The baffles were about 2 inches deep (in the radial direction) spaced one inch inward from the vessel wall, and extending vertically over the entire length of the reactor wall.

Mixing must be continued during the mixing, heating and holding steps and may be continued during activation.

PROCEDURE

The present invention contemplates the use of one of more (preferably 3 to 9) successive reduction/crystallization steps in the presence of seed catalyst. The original seed catalyst may be prepared by following the instructions given in British Pat. No. 1,139,450 or as described herein for the reduction steps (but omitting the addition of seed catalyst). Thus, the mixing, heating and holding steps could be carried out to obtain a first catalyst product which may or may not be of a narrow particle size range. The holding step must be employed to complete the reduction reaction. The first catalyst product is preferably separated from the bulk of the reaction liquor (e.g., by decanting the liquor through a dip leg) before the reactants for the reduction/crystallization step are introduced. In those cases where two or more reduction/crystallization steps are to be carried out in the presence of preformed ("seed") catalyst, the liquor will preferably be decanted each time before introduction of TiCl₄ and DEAC. Alternatively, the reaction liquor may be left in situ.

In either case, the reactor contents are cooled to the mixing temperature (–40° to +15° C.), and the TiCl₄ and DEAC are added in the proportions and resulting concentrations above described (i.e., if diluent is left in the reactor, the molar concentrations in the inlet streams must be appropriately increased). Additional diluent, if desired, can also be added. The TiCl₄ in the newly added reactant stream will be from 0.2 to 4.0 (preferably about 1) moles per mol of originally added TiCl₄.

The reaction mixture is then warmed at a controlled rate of 0.2° to 2.0° C/min to a final temperature of about 25° to 45° C., preferably being warmed at the rate of 0.5° C/min to a holding temperature of 40° C. Unless the holding temperature is at least 40° C. upon standing a discernible amount of catalyst fines will precipitate from the supernatant liquor; if this is to be avoided, the 40° C. final temperature must be employed. If it is acceptable to have this small amount of fines, lower temperatures in the 25° to 40° C. range may be employed. The holding period may be as long as 2 hours, in order to assure complete reduction of the $TiCl_4$. Preferably, the holding period is at least 30 minutes at 40° C. Stirring is maintained during the holding period at the same rate as during the mixing and heating steps. Excessive energy input during the holding stage will lead to the formation of catalyst particles of a smaller average size than otherwise obtainable.

The product obtained by the process of the present invention is a compact catalyst of large particle size, substantially spherical in shape, and having a narrow size range distribution. The ultimate mean particle size (and, where a wide range of particle sizes is exhibited by the seed catalyst, the size distribution) is determined by the number of times that the catalyst is resubmitted to the reduction/crystallization step.

Photographs taken through magnification apparatus show that an agglomeration of catalyst fines occurs in the process of the present invention. Thus, the present invention is not simply crystal growth. These photographs also show that the agglomeration leads to the formation of rounded, substantially rounded or "spherical" catalyst particles which will therefore lead to the production of polymer powders of the same general shape.

EXAMPLES

In order to illustrate the present invention, the following examples are given. In each case, the formation of catalyst was carried out by reduction and crystallization in the following equipment, and following generally the procedure set forth. A 500 ml round-bottom flask, without baffles, equipped with a flat-bladed mechanical stirrer, a thermometer and an addition port is cooled to −30° C. in a Dry Ice/isooctane bath. The stirrer had 2 blades mounted at 180°, with an overall diameter of 6 centimeters. The entire assembly and all catalyst preparations are maintained in an inert atmosphere. To the cooled flask, diethylaluminum chloride or other reducing agent (1.0 to 1.5 molar in n-heptane) is added. The diethylaluminum chloride solution is stirred at a rate between 210 and 400 rpm. The stirring rate is maintained as closely as possible to a specific value during the preparation, i.e., 250 ± 10 rpm. To the diethylaluminum chloride solution, $TiCl_4$ (1.5 to 2.0 molar n-heptane) is added at a rate of 3 mmoles/minute. When all the $TiCl_4$ solution has been added (1.33 mole of $TiCl_4$/mole of diethylaluminum chloride), the mixture is warmed to +40° C. at a rate of 0.5° C. per minute. The stirred reaction mixture is maintained at this temperature for 1 hour. At this point the reaction mixture may be heated directly to the activation temperature or it may be cooled to room temperature until time for high temperature activation.

After the 40° C. aging, the catalyst may be filtered, washed twice with heptane (a 0.005 percent solution of diethylaluminum chloride in heptane is used for all washings), and the catalyst is resuspended in heptane in a glass polymerization tube containing a magnetic stirrer. The heptane quantity used in the washings and resuspension is normally three times the volume of catalyst.

The sealed container with the reaction mixture is heated to 160° C. over a period of 1 hour. After aging at 160° C. for 1 hour, the mixture is allowed to cool over a period of 2 to 4 hours. The catalyst, during this heating, may or may not be stirred. The filtered catalyst is washed twice with heptane, and is dried at room temperature by removing the diluent at reduced pressure.

In illustrating the present invention, the reduction/crystallization step may be repeated three times (Examples 5 and 6) before the resulting catalyst is separated from the reaction mixture and heated for activation. During the entire crystallization and reduction reaction, including both steps of the present invention, the reaction mixture is stirred with a two-bladed, 6 centimeter diameter impeller. The torque input may range from 10 to 25 inch-ounces.

EXAMPLE 1

A solution of 2.274 mmoles per milliliter of titanium tetrachloride in n-heptane was prepared, as was a solution of 1.6106 mmoles per milliliter of diethylaluminum chloride in n-heptane. An admixture of 77 cc of the $TiCl_4$ solution (170.55 mmoles) and 79.42 cc of the diethylaluminum chloride solution (127.91 mmoles) was prepared at −30° C. This gave a molar ratio of $TiCl_4$ to diethylaluminum chloride of about 1.33. To produce a base case, 0.70 grams of finely divided $TiCl_3 \cdot 1/2$ $AlCl_3$ was added, but was in such low proportions as to be disregarded (2 wt. percent based on final total catalyst produced).

The admixture was formed by the addition of the $TiCl_4$ solution to the diethylaluminum chloride solution at the rate of 0.8 cc per minute.

Throughout the addition and throughout the remainder of the reaction, the stirring rate was maintained at about 250 rpm. The temperature was raised at the rate of about 0.5° C. per minute to a final temperature of about 40° C., at which point the heat input was terminated. The catalyst was filtered, washed with n-heptane, and resuspended in heptane. The catalyst was examined and found to have a particle size distribution of about 13 to 31 microns. It had a wide particle size distribution, irregular shape and was black in color.

This illustrates that use of about 2 wt. percent of preformed catalyst is insufficient for the present invention, if only a single reduction step is to be employed.

EXAMPLE 2

A solution of titanium tetrachloride in n-heptane and a solution of diethylaluminum chloride in n-heptane of the concentrations given in Example 1 above were employed in this example as well. 75 cc (170.6 mmoles) of the $TiCl_4$ solution and 79.4 cc (127.9 mmoles) of the diethylaluminum chloride solution with an additional 79.4 cc of n-heptane was prepared by adding the titanium tetrachloride solution to the diethylaluminum chloride solution at the rate of 1.6 cc per minute and a temperature of −30° C. The stirring rate was set at 300 rpm.

The reduction reaction was carried out similar to Example 1, and after the crystal products were obtained by raising the temperature to +40° C., aged for ½ hour, the solution was again cooled to −30° C. and an additional 70.0 cc of the titanium tetrachloride solution and 79.4 cc of the diethylaluminum chloride solution were added. The temperature was again raised at 0.5° C. per minute to a final temperature of +40° C. and aged for 1 hour.

The catalyst product which was obtained from this reduction reaction had an average diameter of 28 microns, a narrow particle size distribution, a spherical shape, black in color. The catalyst structure appeared to be not quite as compact as other products of the present invention, but not "loose" in structure.

This product was then activated as described in the introduction and utilized to polymerize propylene and found to be an excellent catalyst for propylene polymerization yielding 27 grams of polypropylene per gram of catalyst, for a 2-hour polymerization at 65° C. in n-heptane as a reaction diluent. The product contained 96.0 weight percent of materials which were insoluble in boiling n-heptane, an indication of high crystallinity. The intrisic viscosity was 2.74.

EXAMPLE 3

In order to illustrate the use of the present invention with already formed catalysts, Example 3 sets forth the manner in which a low particle size, wide size distribution range, and irregular catalyst was used as a feedstock in the second step of the reduction/crystallization as described in Example 2. In Example 3, an admixture of 4.16 g of a preformed titanium trichloride catalyst having the formula $TiCl_3 \cdot _{0.33} AlCl_3$ was suspended in 86.05 mmoles (53.5 cc) of the diethylaluminum chloride solution described in Example 1 along with an additional 54 cc of n-heptane. To this admixture was added 50 cc (113 mmoles) of the titanium tetrachloride solution described in Example 1, at the rate of 0.8 cc per minute. The mixture was originally made at the temperature of −30° C. with a stirring rate of 240 rpm. The admixture was then warmed at the rate of 0.5° C. per minute to about +40° C., after which it was aged at 40° C. for about 1 hour.

Whereas the original catalyst showed a wide particle size distribution, with a large quantity of catalyst fines, the product from this experiment had an average particle size diameter of about 16 microns with a narrow size range distribution, irregular in shape and black in color. The structure was compact. Although the particles of the product catalyst were irregular in shape, they were not as irregular as the original catalyst and by repeating this step, it is expected that a product of a larger average diameter and a regular shape can be obtained. The seed material and the solvent is maintained below +5° C. during mixing, preferably below −15° C. It was also discovered that while diethylaluminum chloride is the optimum reducing agent, the addition of small quantities of ethylaluminum dichloride leads to the formation of larger particle sizes. Therefore, the reducing agent can comprise from 0 to 100 percent diethylaluminum chloride, although it is preferred that no more than 25 percent of the reducing reagent be ethylaluminum dichloride, with the remainder being diethylalumium chloride. In other cases, the preferred reducing agent can be mixed with triethylaluminum in quantities where the triethylaluminum to diethylaluminum ratio varies from 0 to 0.25.

EXAMPLE 4

In this example, the catalyst was initially prepared and separately recovered, and then treated with the second step of the present invention as described above.

Twenty-five cc of a solution of titanium tetrachloride in n-heptane (2.27 molar) as described in Example 1 was added at the rate of 1.61 cc per minute to 160 cc of a solution of diethylaluminum chloride (0.8 molar in heptane) containing 20 grams of a catalyst prepared and isolated as described above. The entire reaction mixture is stirred at 250 rpm at −30° C. while the $TiCl_4$ solution is added. Subsequent to the addition, the reaction mixture is warmed at a controlled rate of 0.5° C. per minute until a reaction temperature of +40° C. is reached. The mixture is stirred at +40° C. for one hour after which examination of the isolated catalyst shows that a 98 percent theoretical yield of catalyst is achieved. The catalyst particle size distribution is narrow.

EXAMPLE 5

In this example, the catalyst was prepared by a multiple shot technique as described in the following: A solution of $TiCl_4$ in n-heptane and a solution of $AlEt_2Cl$ in n-heptane of the concentration given in Example 1 were employed in this example as well. A mixture of 79.4 cc (127.9 mmoles) of the $AlEt_2Cl$ solution and an additional 79.4 cc of n-heptane was prepared (resulting in a concentration of about 0.8 mmoles of $AlEt_2Cl$ per milliliter). About 75 cc (170.6 mmoles) of $TiCl_4$ solution were added to the $AlEt_2Cl$ solution at the rate of 1.6 cc/minute and at a temperature of −20° C. The $TiCl_4$/diethylaluminum chloride mol ratio was about 1.33. The stirring rate was set at 250 rpm. The reduction reaction was carried out similar to Example 1 and after the crystal products were obtained by raising the temperature to +40° C., aged for ½ hour, the solution was again cooled to −30° C. The catalyst product was thus the preformed catalyst for use in the present process. An additional 17.9 cc of a concentrated $AlEt_2Cl$ solution (7.155 molar in n-heptane) were added to the reaction mixture. Subsequently, 37.6 cc of a concentrated $TiCl_4$ (4.55 molar in n-heptane) was added to the stirred reaction mixture at −30° C. over a period of 20 minutes. The temperature was again raised at 0.5 per minute to a final temperature of +40° C. and aged for ½ hour. The $TiCl_4$/diethylaluminum chloride mol ratio was about 0.75. The previous step was repeated two more times. The catalyst product which was obtained from the final reduction reaction had an average diameter of 24 microns, was spherical in shape and black in color. The change in catalyst particle size through the successive reductions are tabulated in Table IV below.

EXAMPLE 6

Seventy-five cc of a 2.274 molar solution of $TiCl_4$ in n-heptane was prepared and added to 135 cc of a 189 molar solution of $AlEtCl_2$ in heptane. The temperature of mixing was −20° C. and the stirring speed in the baffled reactor was 240 rpm. The reduction was accomplished as in Experiment 1. The reduction reaction was carried out similar to Example 1, and after the crystal products were obtained by raising the temperature to +40° C., aged for ½ hour, the solution was again cooled to −20° C. and an additional 135 cc of AlEtCl$_2$ solution (1.89 molar in n-heptane) was added to the solution. Subsequently 37.6 cc of a 4.55 molar solution of TiCl$_4$ in n-heptane was added over a 20 minute period. The temperature was again raised at 0.5°C/minute to a final temperature of +40° C. and the reaction was aged at this temperature for 1 hour.

The secondary reduction as described immediately here before was repeated two more times. The catalyst product, which was obtained from the fourth reduction reaction, had an average diameter of 47 microns in diameter, a narrow particle size distribution, a spherical shape, and was black in color. The catalyst structure appeared to be compact. The change in catalyst diameter as a result of each successive reduction is tabulated in Table IV below and illustrates this invention.

One could get these 3 micron-sized particles to an acceptable mean particle diameter, i.e., at least 10 microns by subjecting them to a series of reduction/crystallization steps, e.g. multiple steps, according to the technique of the invention.

We claim:

1. A process for producing a TiCl$_3$n AlCl$_3$, wherein n is a number either from about 0.15 to 0.50 or from about 0.3 to 1.0, olefin polymerization, catalyst product in round, compact, particulate form having a mean particle diamether within the range of about 10 to 200 microns, which comprises the steps of:
   a. forming a mixture of finely-divided preformed solid "seed" catalyst having essentially the same chemical composition as said desired catalyst product, but more finely-divided than said product, with

TABLE IV

| EXAMPLE NO. (STEP) | TiCl$_4$ Conc. | Mmole | MULTIPLE SEEDING DATA AlEt$_2$Cl Conc. | Mmole | AlEtCl$_2$ Conc. | Mmole | CATALYST Diameter($\mu$) | Distribution |
|---|---|---|---|---|---|---|---|---|
| 5(1) | 2.274 | 171 | 1.61 | 128 | | | 15 | wide |
| 5(2) | 4.6 | 171 | 7.2 | 128 | | | 18 | wide |
| 5(3) | 4.6 | 171 | 7.2 | 128 | | | 20 | wide |
| 5(4) | 4.6 | 171 | 7.2 | 85 | | | 24 | average |
| 6(1) | 2.27 | 171 | | | 1.9 | 256 | 33 | narrow |
| 6(2) | 4.6 | 171 | | | 1.9 | 256 | 37 | narrow |
| 6(3) | 4.6 | 171 | | | 1.9 | 256 | 43 | narrow |
| 6(4) | 4.6 | 171 | | | 1.9 | 171 | 47 | narrow |

From Table IV, it will be seen that the present invention results in larger catalyst particles and, when a wide distribution of particle sizes exists in the preformed catalyst, results in a narrowing of that particle size range.

Although AlEt$_2$Cl, ETAlCl$_2$ and AlEt$_3$ or mixtures thereof are preferred organometallic reducing agents, the generic class of suitable organometallic reducing agents includes:

R$_2$Mg, RMgX, NaR or an MR wherein:
R is a C to C$_5$ alkyl or substituted alkyl radical;
Mg is Magnesium;
X is Cl, Br or I;
M is a metal from Groups IA, IIA, IIB or IIIA of the Periodical Table.

Moreover, although the preferred activation temperatures and times are as set forth in TABLE III, the broad operable ranges for activation are from 90° to 185° C. for a time period of from 20 minutes to 5 hours.

In addition, it is to be noted that mean particle diameters falling within the range of 20 microns up to 200 microns will be the norm, however, there are certain infrequent but important situations where mean particle diameters of as low as 10 and up to 30 microns would be exceptionally useful.

This occurs when TiCl$_4$ is reduced in a first step with AlEt$_3$ which is an example of the unusual situation where extremely small catalyst particles are formed, i.e., about 3 microns mean particle diameter. However, these relatively small particle catalysts are extremely active. And they can be increased in size to a satisfactory level by the technique of this invention.

Thus, a first step reduction of TiCL$_4$ with AlET$_2$Cl results in a catalyst particle with a mean particle diameter in the approximately three (3) micron range.

TiCl$_4$ and a reducing agent selected from the group consisting of:

R$_2$Mg, RMgX, NaR, or an MR, wherein:
R is a C to C$_5$ alkyl or substituted alkyl radical;
Mg is Magnesium;
X is Cl, Br or I;
M is a metal from Groups IA, IIA, IIB or IIIA of the Periodical Table, at a temperature sufficiently low so that the reducing rate for said TiCl$_4$ is negligible, in a suitable inert diluent, in which both TiCl$_4$ and said reducing agent are soluble, but in which said seed catalyst is insoluble, b. heating said mixture at a controlled slow rate of 0.2° C/Min to 2.0° C/Min while mixing until a temperature of +25° C is reached.

2. A process according to claim 1 wherein said reducing agent is selected from the group consisting of:
   i diethyl aluminum chloride;
   ii ethyl aluminum chloride;
   iii triethyl aluminum; and
   iv mixtures of the foregoing.

3. A process according to claim 2 wherein said mean particle diameter range is 20 to 200 microns.

4. A process according to claim 2 wherein said mean particle diameter range is 10 to 50 microns.

5. A process in accordance with claim 1, wherein the reduction step is carried out sequentially at least two times, using the catalyst formed during a preceding reduction step as the preformed catalyst.

6. A process in accordance with claim 1 wherein the reaction conditions include a beginning temperature from −40° C. to +15° C., a heating rate from 0.2° to 2.0° C/min, and a holding temperature of from 25° to 45° C.

7. A process according to claim 1 wherein steps a-b are repeated at least twice and after conclusion of the final replication of steps a-b, said product is activated by heating at a temperature of 90° to 185° C for a time of 20 minutes to 5 hours.

8. A process according to claim 5 wherein said temperature is 145° to 185° C. and said time is from 30 to 120 minutes.

9. A method according to claim 2 wherein said reducing agent is diethyl aluminum chloride.

10. A method according to claim 2 wherein said reducing agent is ethyl aluminum dichloride.

11. A method according to claim 2 wherein said reducing agent is triethyl aluminum.

12. A method according to claim 2 wherein said reducing agent is a mixture of diethyl aluminum dichloride and ethyl aluminum dichloride.

13. A process for producing polymerization catalysts which comprises:
   a. introducing into a reaction zone one part by weight of a finely-divided preformed catalyst having substantially the same chemical composition as the desired final product, said composition corresponding to the formula:

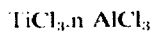

wherein n is from 0.15 to 0.50;
   b. admixing with said preformed catalyst, at a temperature from about −40° C. to about −5° C., a solution of $TiCl_4$ in a diluent, a solution of diethylaluminum chloride in a diluent, and additional diluent chosen from the group consisting of $C_5$ to $C_{12}$ paraffinic hydrocarbons and mixtures thereof, the mol ratio of TiCl4 to diethylaluminum chloride being from 0.5 to 2.0, the $TiCl_4$ concentration being from 0.5 to 4 molar, the diethylaluminum chloride concentration being from 0.1 to 7 molar, and sufficient $TiCl_4$ and diethylaluminum being added to produce, upon reduction of the $TiCl_4$, from 19 to 39 parts by weight of additional catalyst having essentially the same chemical composition as the preformed catalyst,
   c. heating said admixture at a rate of 0.2 to 2.0° C/min until a holding temperature of about 25° C. to about 45° C. is reached.
   d. holding said admixture at said holding temperature for a time period from about 0 to 120 minutes, sufficient to substantially complete the reduction reaction,
   said reaction zone being maintained under well-mixed conditions throughout steps (b) through (d),
   e. thereafter at least once repeating steps (b) through (d), the total catalyst in the reaction zone at the end holding period providing the preformed catalyst for the next succeeding step,
   f. and, after conclusion of the final replication of steps (b) through (d), activating said catalyst by heating at a temperature of 145° C. to 185° C. for a period of 30 to 120 minutes.

14. A process in accordance with claim 13 wherein the diluent in n-heptane, the $TiCl_4$ concentration is about 4.55 molar, the diethylaluminum chloride concentration is about 7.15 molar, the diethylaluminum chloride is first admixed with said additional diluent to produce a diluted concentration from 3 to 5 molar, and the $TiCl_4$ solution is then added to said diluted diethylaluminum chloride at a relatively slow addition rate.

15. A process in accordance with claim 14 wherein the mixing temperature is about −20° C., the heating rate is about 0.5° C/min, the holding temperature is about +40° C., and the holding time is about 30 minutes; and the mixture is cooled to about −30° C. before repeating steps (b) through (d), and steps (b) through (d) are carried out three to nine times.

16. A process in accordance with claim 15 wherein the $TiCl_4$ solution is added over a period of about 20 minutes and the mixing energy input during steps (b) through (d) is from 100 to 300 watts/liter.

17. A process in accordance with claim 9 wherein, after the last replication of steps (b) through (d), the catalyst product is activated by heating at a temperature from 145° C. to 180° C. for a period of 30 to 120 minutes.

18. A process according to claim 1 wherein said reduction step is carried out sequentially 3 to 9 times.

* * * * *